3,830,938
METHOD OF MAKING BREAD OF HIGH SUGAR CONTENT

Eiji Morikawa, Tokyo; Kenkichi Kodama, Akita-ken; Tokuji Tanaka; Hisayoshi Fukatsu, and Shizuo Enokida, Tokyo, Japan, assignors to Sankyo Company Limited, Tokyo, Japan
No Drawing. Filed Apr. 12, 1972, Ser. No. 243,402
Claims priority, application Japan, Apr. 14, 1971, 46/23,607
Int. Cl. A21d 2/18, 8/04
U.S. Cl. 426—18                    1 Claim

ABSTRACT OF THE DISCLOSURE

Method of making bread of high sugar content which comprises adding Saccharomyces rosei to bread ingredients high in sugar content to prepare a dough, fermenting the dough and then baking the fermented dough. According to the present method, excellent fermentation power and high dough raising power as well as a reduced period of fermentation and a smaller amount of the yeast can be attained.

---

This invention relates to a method of making bread of high sugar content, particularly fancy breads such as sweet rolls and Danish pastry.

The sugar content in sweet dough is usually as high as 20–30% based on the weight of the wheat flour used in the bread. As sweetening materials used therein, there may be mentioned cane sugar and dextrose. Recently, a sugar solution is frequently used as a sweetening agent with a view to economy as well as for improvement of efficiency in the bread-making process. When the conventional bakers yeast (Saccharomyces cerevisiae) is used in making breads high in sugar content, it does not function sufficiently in a dough having a high sugar concentration and display satisfactorily its dough raising power. For that reason, such countermeasures as decreasing the amount of sugar to be added, increasing the amount of yeast to be used or prolonging the fermentation time are being unavoidably taken. Further, it is also a strong desideratum to improve on the process for baking a dough of high sugar content into bread in view of such circumstances where preference is reluctantly given to natural sweetening agents over synthetic sweetening agents owing to administrative control recently exercised over the latter when used in food and drink.

The quest extensively conducted by the present inventors for a yeast from among many bakers' yeasts, said yeast having a high fermentation power when used in a dough of high sugar content and being capable of rendering a crust, crumb and flavor of the resulting bread after baking favorable, has resulted in the finding that Saccharomyces rosei may preferably be used for accomplishing the above object.

Microbiological characteristics of Saccaromyces rosei are as have been described in J. Lodder, "The Yeast" 679 (1970), North-Holland Publishing Company, Amsterdam and London, wherein the microbiological characteristics of Saccharomyces rosei are described as follows:

Growth in malt extract: After 3 days at 28° C. the cells are spheroidal to short-ellipsoidal, $(2.5–6.5) \times (2.5–7.0)\mu$, and occur singly, in pairs or in small clusters. Occasionally giant cells may be formed which may measure up to $9 \times 9\mu$. Cells may contain lipid globules. A sediment is formed and occasionally an incomplete ring as well.

After one month at room temperature a sediment is present and frequently a ring as well.

Growth on malt agar: After 3 days at 28° C. the cells are spheroidal to short-ellipsoidal, $(2.0–6.5) \times (2.0–7.0)\mu$, and occur singly, in pairs or in small clusters. Cells may contain lipid globules. The streak culture is white to greyish-cream, occasionally brownish-cream, frequently rather flat, occasionally somewhat raised, smooth, infrequently somewhat crispulate or verruculose or with some transverse striations, shiny. The margin is entire to undulating.

After one month at room temperature the culture is cream-colored, greyish-cream to brownish-cream, often flat and frequently rather spreading, occasionally somewhat raised, smooth or with transverse striations, occasionally verruculose or papillate, infrequently crispulate or pulvinate, shiny, rarely somewhat dull. The margin may be entire or undulating, seldom lobiform.

Dalmau plate cultures on corn meal agar: No pseudomycelium is formed. Blastospores may, however, be arranged in short chains or small tree-like aggregates.

Formation of ascospores: Cells bearing protuberances which resemble conjugation tubes are formed. Usually somatogamous autogamy and less frequently the conjugation of independent cells precedes ascus formation. Rarely are diploid cells directly transformed into asci. The asci usually contain one to two rarely one to four, ascospores. The ascospores may contain lipid globules.

Six of the 14 strains studied were ascogenous. Sporulation was observed on YM agar and on acetate agar.

Fermentation:
    Glucose+
    Galactose—
    Sucrose+
    Maltose—
    Cellobiose—
    Trehalose+(frequently slow)
    Lactose—
    Melibiose—
    Raffinose+⅓
    Melezitose—
    Inulin+(frequently slow)
    Soluble starch—
    α-Methyl-D-glucoside—or+(slow)
Assimilation of carbon compounds:
    Glucose+
    Galactose—
    L-Sobose—or+
    Sucrose+
    Maltose—(acquired) or+
    Cellobiose—
    Trehalose+
    Lactose—
    Melibiose—
    Raffinose+
    Melezitose—
    Inulin+
    Soluble starch—
    D-Xylose—
    L-Arabinose—
    D-Arabinose—
    D-Ribose—
    L-Rhamnose—
    Ethanol+(occasionally weak)
    Glycerol+or—
    Erythritol—
    Ribitol—
    Galactitol—
    D-Mannitol+
    D-Gluitol+or—
    α-Methyl-D-glucoside+or—
    Salicin—
    DL-Lactic acid+(occasionally slow)
    Succinic acid—
    Citric acid—
    Inositol—

Splitting of arbutin: Absent.
Assimilation of nitrogen compounds:
  Potassium nitrate—
  Ethylamine hydrochloride+or—
Growth in vitamin-free medium: Variable.
Growth on 50% (w./w.) glucose-yeast extract agar: Positive.
Growth on 60% (w./w.) glucose-yeast extract agar: Absent.
Growth at 37° C.: Absent.
Cycloheximide resistance: Absent.

*Saccharomyces rosei* Y–134–5 which is preferably used in the present invention as a starting yeast has been deposited with Fermentation Research Institute, Agency of Industrial Science and Technology, Japan, under accession No. 905. This yeast is prepared by batch or continuous culture in a commonly used culture medium, for example, a medium composed mainly of molasses, according to procedures similar to those employed in the preparation of the conventional bakers' yeast, and the resulting yeast cells are used in the form of a compressed or dry yeast.

For making bread using *Saccharomyces rosei* of the present invention, exactly the same procedure as in the conventional method of making bread except that *Saccharomyces rosei* is used in place of the conventionally known *Saccharomyces cerevisiae*. That is, bread ingredients comprising grain flour, sugar, table salt and the like and *Saccharomyces rosei* are mixed with water to prepare a dough. In this case, any bread making methods, such as straight dough, sponge dough and brew ferment methods may be used. The dough is maintained under proper conditions to permit fermentation and, upon expansion by fermentation the expanded dough is baked into bread.

The present *Saccharomyces rosei*, when used as a starting yeast in the process for making bread, is found to be high in resistance to sugar, is able to sufficiently undergo fermentation even in a dough containing 35% by weight or more of sugar and displays excellent dough raising power, as compared with the conventional *Saccharomyces cerevisiae*. The present yeast is effectively used in a dough containing, as a sweetening agent, cane sugar, beet sugar, dextrose and fruit sugar, particularly most effective in a dough containing liquid invert sugar, whereby breads of good quality having high sugar content can be obtained according to a process similar to the ordinary method of making bread. Thus, the present invention is a markedly improved method for making bread, wherein the present yeast is used without necessitating any increase in amount as is seen in the conventional process, and also the working time for making bread is shortened.

Shown below are the results obtained in the test carried out in order to determine the dough raising power of the present yeast when used in a dough for making sweet dough.

The test method was carried out according to the test method established by Yeast Industry Association, Japan. A test dough was prepared by thoroughly mixing together 100 g. of wheat flour, 30 g. of cane sugar, 0.5 g. of table salt and 3 g. of compressed cells of *Saccharomyces rosei*, and mixing the resulting mixture with 48 ml. of water. Temperature of the dough was adjusted to 30° C., placed in a glass cylinder of 6.5 cm. in inside diameter, and fermentation was conducted in an incubator at 30° C. Volume of the fermented dough after the lapse of 90 minutes was read and tabulated as the dough raising power of the test yeast. In this test, a commercially available bakers' yeast (*Saccharomyces cerevisiae*) produced by Sankyo Company, Limited, Japan was used as a control.

TABLE 1

| Yeast | Dough raising power, ml. | Net dough raising power,[1] ml. |
|---|---|---|
| Saccharomyces rosei | 505 | 355 |
| Saccharomyces cerevisiae (control) | 385 | 235 |

[1] The net dough raising power denoted in the above table was a value obtained by subtracting the volume of the dough of 150 ml. prior to the fermentation from the measured value of the dough raising power determined.

From the test results shown above, it is understood that the yeast of the present invention displays excellent fermentation power in a dough of high sugar content and has high dough raising power. The present invention is illustrated below with reference to examples.

EXAMPLE 1

Method: Sponge dough method for making sweet dough containing 3% cane sugar

Sponge: 385 g. of wheat flour, 16.5 g. of a compressed yeast of *Saccharomyces rosei*, 16.5 g. of dextrose and 210 ml. of water
Mixing time: 5 minutes at low speed, 2 minutes at high dough: 26° C.
Fermentation time: 2 hours
Dough: 165 g. of wheat flour, 4.4 g. of table salt, 165 g. of liquid sugar (sugar concentration: 76% conversion: 58%), 22 g. of shortening and 33 g. of water
Mixing time: 5 minutes at low speed 2 minutes at high speed, 2 minutes at low speed at the time of addition of the shortening, and 3 minutes at high speed
Temperature of finished dough: 28° C.
Fermentation time: 50 minutes Weight ratios of the constituents of an aggregate of the sponge and dough, based on the weight of the wheat flour taken as 100, were represented as follows:

Wheat flour: 100, compressed yeast: 3, table salt: 0.8, liquid sugar: 30 (equivalent to 19.3, calculated as sugar), dextrose: 3, shortening: 3 and water: 44.

After mixing the sponge with the dough, the resulting dough was subdivided into a given weight, the doughs thus formed were placed in a proofer kept at a temperature of 40° C. and humidity of 85% and thereafter baked in an oven at 200° C. for 20 minutes.

Volume of the baked bread was 2232 ml., and the bread thus obtained was found to be a flavorous sweet dough of good quality with a crust of good color, favorable crumb and less yeasty.

On the other hand, volume of the bread obtained according to the same procedure as in the present example except that the commercially available *Saccharomyces cerevisiae* produced by Sankyo Company Limited, Japan was used as a control was 2050 ml., and the quality of the sweet dough thus obtained was found to be inferior to that of the bread prepared according to the present invention.

EXAMPLE 2

Method: Sponge dough method for making bread containing 3% cane sugar

A sweet dough was obtained by the same procedure as in Example 1 except that among the constituents of the mixed dough, cane sugar was used in place of the liquid sugar in the proportion of 27 to 100 of the wheat flour in said dough. Volume of the baked bread using *Saccharomyces rosei* of the present invention was found to be 2200 ml., while that of the bread obtained by using a control *Saccharomyces cerevisiae* was 2050 ml.

EXAMPLE 3

A dough for sweet dough was prepared according to exactly the same manner as in Example 1. Immediately after the dough expanded to a volume of 963 ml., it was subdivided into a given weight and placed in a proofer to permit it to further expand and then baked in an oven. After baking for 97 minutes, the baked bread was found to have a volume of 2188 ml.

On the other hand, a dough for sweet dough was prepared according to the same procedure as the control described in Example 1. The bread obtained according to the same procedure as in the present example was found to have the same volume as in the bread obtained according to the present example, except that the baking time needed was 110 minutes.

In the cases of bread produced according to the method of the present invention, no adverse effect on quality of the bread due to shortened baking time was observed.

What is claimed is:

1. A method of making bread which comprises preparing a dough by mixing *Saccharomyces rosei* Y-134-5 in an amount sufficient to promote fermentation with bread ingredients comprising wheat flour and sugar, said sugar taken in an amount of 20-35% based on the weight of the wheat flour, fermenting the dough and then baking the fermented dough.

References Cited

UNITED STATES PATENTS 3,684,525     8/1972     Hanssen _____ 99—90 R X

JAMES R. HOFFMAN, Primary Examiner